United States Patent [19]

Mayer

[11] Patent Number: 4,748,943
[45] Date of Patent: Jun. 7, 1988

[54] COOLING INSTALLATION FOR INTERNAL COMBUSTION ENGINES WITH AN AUXILIARY FAN

[75] Inventor: Karl-Heinz Mayer, Waiblingen-Hohenacker, Fed. Rep. of Germany

[73] Assignee: Dr. Ing. h.c.F. Porsche Aktiengesellschaft, Stuttgart, Fed. Rep. of Germany

[21] Appl. No.: 908,287

[22] Filed: Sep. 17, 1986

[30] Foreign Application Priority Data

Sep. 17, 1985 [DE] Fed. Rep. of Germany ........ 3533093

[51] Int. Cl.⁴ ............................................... F01P 5/14
[52] U.S. Cl. ................... 123/41.15; 123/41.65; 123/41.49; 123/198 D; 70/241; 292/DIG. 14
[58] Field of Search ............... 123/41.15, 41.49, 41.65, 123/41.66, 198 D; 70/241; 292/DIG. 14

[56] References Cited

U.S. PATENT DOCUMENTS

| 2,756,085 | 7/1956 | Hochstadt | 292/DIG. 14 |
| 3,611,287 | 10/1971 | Hoff | 292/DIG. 14 |
| 4,409,933 | 10/1983 | Inoue | 123/41.49 |

FOREIGN PATENT DOCUMENTS

| 166045 | 9/1954 | Australia | 70/241 |
| 3445878 | 7/1986 | Fed. Rep. of Germany . | |

Primary Examiner—E. Rollins Cross
Attorney, Agent, or Firm—Barnes & Thornburg

[57] ABSTRACT

A cooling system for an internal combustion engine equipped with an auxiliary fan, which is adapted to be selectively engaged and is arranged inside of a space adapted to be closed by means of a lid (engine hood); the fan is controlled in dependence on the position of this lid. Especially with an open engine hood, a sudden and unexpectedly occurring re-starting of the fan is avoided having been turned-off so that injuries to limbs of a servicing person who works in direct proximity of the fan is practically precluded.

18 Claims, 3 Drawing Sheets

COOLING INSTALLATION FOR INTERNAL COMBUSTION ENGINES WITH AN AUXILIARY FAN

The present invention relates to a cooling system for internal combustion engines with at least one auxiliary fan adapted to be switched on which is arranged inside a space adapted to be closed by means of a lid, especially of an internal combustion engine space of a body of a vehicle which is adapted to be closed off by an engine hood.

Especially internal combustion engines of vehicles are equipped evermore frequently with cooling installations whose fans are controllable in dependence on the cooling air requirement of the internal combustion engine. With such types of cooling installations, injuries frequently occur in body parts of servicing persons working in direct proximity of the fan when the latter starts to run suddenly and unexpectedly.

For this reason, guard screens were already installed in motor vehicles, within which the movable parts of the fan are arranged. However, they entail the disadvantage that, on the one hand, they offer only a limited protection against injuries and, on the other, they strongly reduce the rate of air flow—especially by reasons of their susceptibility to soiling.

Furthermore, a locking mechanism for engine hoods of motor vehicles is disclosed in the U.S. Pat. No. 2,756,085 in which the closed position of the hood is monitored by a switch. However, the signalling circuit connected to the switch only serves the purpose of warning a driver during the start or during the drive about a non-completely closed engine hood.

It is therefore the object of the present invention to provide a cooling system for internal combustion engines with an auxiliary fan adapted to be switched on which assists in avoiding injuries in body parts of servicing persons, especially at their hands and arms without noticeably impairing the operation of the internal combustion engine or of the cooling system necessary therefor.

The underlying problems are solved according to the present invention in that with an open hood, the fan is turned off and/or controllable into a condition which prevents a surprising restarting after a preceding turning-off and/or which announces beforehand by acoustical or optical signals the restarting thereof or an increased cooling requirement of the internal combustion engine.

The advantages of the present invention reside primarily in that a cooling installation for internal combustion engines with an auxiliary fan adapted to be turned on is created which assists in reliably avoiding injuries to body parts of a servicing person without noticeably interfering with the operation of the internal combustion engine and of the cooling installation thereof. The additional measures necessary for achieving this goal are characterized by slight expenditure, can be manufactured in a cost-favorable manner and additionally are suitable for refitting existing vehicles.

These and other objects, features and advantages of the present invention will become more apparent from the following description when taken in connection with the accompanying drawing which shows, for purposes of illustration only, several embodiments in accordance with the present invention, and wherein.

Figure 1:
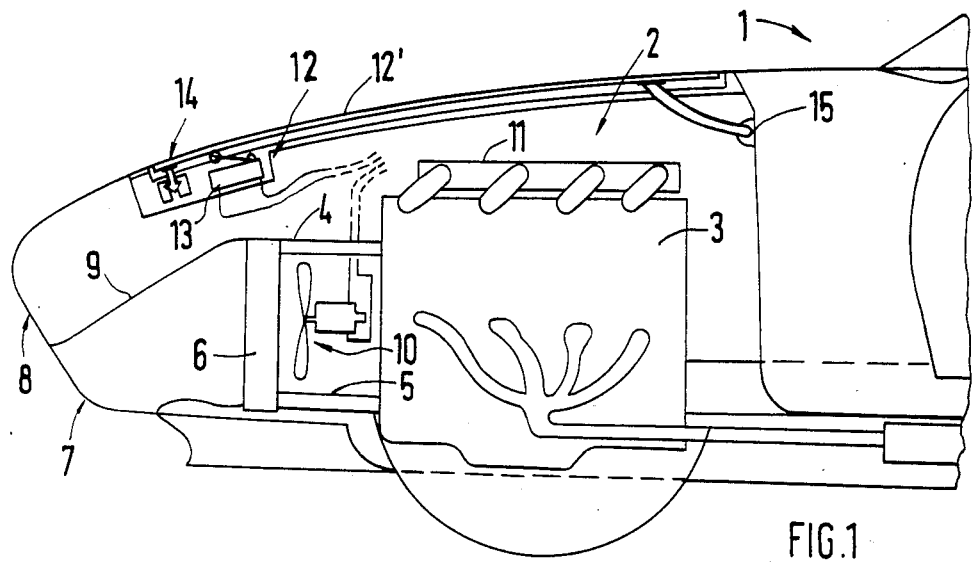
FIG. 1 is a schematic cross-sectional view through an internal combustion engine space of a motor vehicle.

Referring now to the drawing wherein like reference numerals are used throughout the various views to designate like parts, a motor vehicle generally designated by reference numeral 1 is illustrated in FIG. 1 in whose front section or internal combustion engine space generally designated by reference numeral 2 is arranged an internal combustion engine 3. The internal combustion engine 3 is connected by way of cooling medium lines 4 and 5 with a radiator 6 for a liquid cooling medium; the radiator 6 is acted upon by the cooling air produced by the air flow during the vehicle drive by way of a body opening 7 in a vehicle front end 8 and by way of a cooling air guidance 9.

When the motor vehicle stands still or when the cooling by the air flow of the moving vehicle is not adequate by reason of too low a velocity, the fluid medium radiator 6, respectively, the internal combustion engine 3 can be forcibly cooled by way of a fan 10 driven by an electric motor when a temperature in the cooling system and/or of the internal combustion engine exceeds a predetermined limit value. This forced cooling is used to an increasing extent in modern motor vehicles also when the internal combustion engine space 2 heats up excessively—after turning off the internal combustion engine by reason of the residual heat stored in the engine. It can be prevented in this manner that fuel lines (not shown) which are located in the area of a suction pipe system 11, are heated up above the boiling point of the fuel; a vapor bubble formation in the fuel system which leads to starting difficulties is thus avoided with certainty.

However, with the use of such auxiliary fans driven by electric motors and turned on only part of the time, the number of injuries to limbs of the servicing personnel for motor vehicles, especially to hands and arms, has risen jump-like; this is the case especially if a servicing person has worked unsuspectingly within the area of the—standing-still—fan and the latter has started suddenly and totally unexpectedly for such person.

In order to avoid such an unexpected starting of the fan or to warn the servicing personnel of such imminent starting, a switch (contact switch) 13 is arranged on a frame 12 in which a cover (engine hood) 12' is supported in the closed condition. An area for arranging the switch which is located in a position of the frame 12 adjacent a locking mechanism 14 and remote from the pivot point 15 of the engine hood 12', has thereby proved particularly favorable. The switch is non-actuated with an open engine hood 12' and can thereby either directly interrupt an energy or current supply to the fan or can act on a control apparatus which influences the fan or produces a warning signal or possibly turns off the internal combustion engine.

The switch 13 may, of course, also be a proximity switch; similarly an inclination (mercury) switch can be used which is secured at the engine hood 12' and opens its contacts in the open position thereof.

Figure 2:
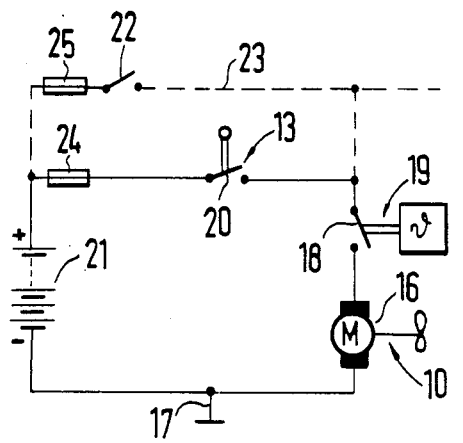
FIG. 2 is an electric circuit diagram for a fan driven by an electric motor in accordance with this invention.

FIG. 2 illustrates how an electric motor 16 for the drive of the electric-motor-driven fan 10 is connected with the contact switch 13. The electric motor 16 is connected with one terminal to a vehicle ground 17 and with its other terminal by way of a normally open contact 18 of a thermal switch generally designated by reference numeral 19 monitoring an engine temperature and by way of a normally open contact 20 of the contact switch 13 with a positive terminal (+) of a vehicle battery 21 whose negative terminal (−) is also connected to vehicle ground 17. The contact switch 13 is actuated when the engine hood 12' is closed so that the normally open contact 20 closes the energizing circuit between battery 21 and thermal switch 19. The fan 10 can thus be controlled in dependence on the thermal switch 19. If, in contrast, the engine hood 12' is opened, then the normally open switch 20 disconnects the electric motor 16 of the fan 10 from the battery 21. The fan 10 can thus no longer cause any hand injuries of the servicing personnel.

However, as the larger number of injuries occurs with a turned-off internal combustion engine (the servicing personnel is then apparently no longer as careful because one normally has to reckon with the starting of the fan 10 when the engine is running), it may also suffice to disconnect the fan 10 from the battery 21 exclusively with a turned-off internal combustion engine if additionally the engine hood 12' is opened. This can take place in that an ignition switch 22 (FIG. 2) of an ignition circuit 23 is connected in parallel with the contact switch 13 (shown in dash lines). The circuits are each safeguarded by fuses 24 and 25.

Figure 3:
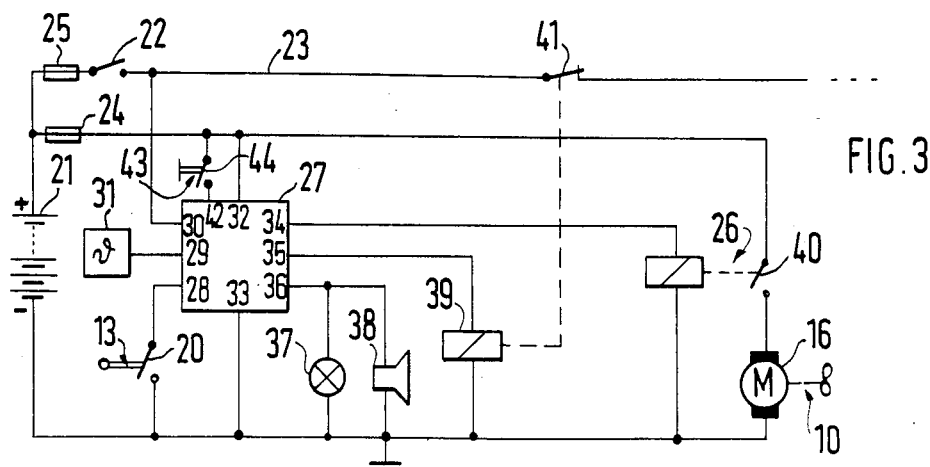
FIG. 3 is a schematic circuit diagram similar to FIG. 2 but equipped with a control apparatus for the fan in accordance with the present invention.

A more extensive embodiment is illustrated in FIG. 3. The fan is thereby controlled by a control apparatus 27 by way of an electronic or electromechanical relay generally designated by reference numeral 26; of course, the relay 26 may also be contained within the control apparatus 27.

The control apparatus 27, depending on the equipment, receives at its inputs 28, 29 and 30 signals from the contact switch 13, from a temperature switch or temperature sensor 31 monitoring the engine temperature and from the ignition switch 22. It is supplied with the necessary operating current by way of the terminals 32 and 33. The relay 26 and depending on equipment, a signal transmitter producing an optical/acoustical signal (warning light 37 and/or warning buzzer 38) and a relay 39 for interrupting the ignition current and/or the fuel supply, are controlled by means of the outputs 34, 35 and 36. The turning-on of the auxiliary fan takes place thereby by means of a normally open contact 40 actuated by the relay 26, whereas the interruption of the ignition current takes place by means of a normally closed switch 41 controlled by the relay 39. Furthermore, an additional input 42 may be provided in the control apparatus 27 which is influenced by a manually actuated push-button switch 43 (with a normally open contact 44 connected to positive terminal (+)) and which will be described more fully hereinafter.

Different modifications of the control of the fan 10, of the warning light 37 and of the buzzer 38 as well as of the relay for the ignition current interruption are possible by means of the control apparatus 27:

Modifications 1 and 2 correspond to the embodiment described by reference to FIG. 3: a temperature value from the temperature sensor 31 is compared with a reference value and upon exceeding the reference value, the fan 10 is controlled to start insofar as either the engine hood is closed or the engine hood is opened and the ignition current switch 22 is closed.

Modification 3 provides to turn off the fan when the limit value is exceeded and the engine hood is opened, as well as to energize the relay 39 for the ignition current interruption and/or fuel supply interruption and the warning lights 37 or the buzzer 38.

In the modification 4, initially the warning light 37, respectively, buzzer 38 are energized when the reference value is exceed and the engine hood is opened, and after a time delay of a few seconds, the auxiliary fan 10 is additionally turned on.

Finally, in the modification 5, after exceeding the reference value and with an opened engine hood, initially the signal transmitters 37 and 38 and after a few seconds, the relay 39 for turning off the internal combustion engine are energized insofar as the fan 10 was not energized in the meantime by the servicing personnel by means of the push button switch 43 accessible in the internal combustion engine space 10 whereby the fan is again automatically turned off when the temperature value drops below the reference value.

Common to all modifications is the fact that with a closed engine hood the normal temperature control function (turning on of the fan upon exceeding and turning off when falling below the reference value) remains completely preserved.

The block diagrams illustrated in the following FIGS. 4 to 8 show an internal circuit connection of the control apparatus 27 between its inputs 28 to 30 and 42 and its outputs 34 to 36. For reasons of simplicity, the illustration of the internal current supply has been dispensed with in these figures as also the illustration of the conventional coupling components at the inputs and outputs; these coupling components may include, in a known manner, means for the signal preparation and/or voltage isolation as well as drivers and electronic or electromagnetic switching members.

Figure 4:
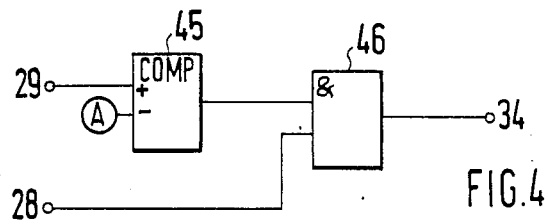
FIGS. 4 to 8 are block diagrams of the control apparatus according to FIG. 3 corresponding to a first to fifth modification in accordance with the present invention.

FIG. 4 illustrates a basic configuration corresponding to the aforementioned modification 1 which is contained essentially also in all other modifications. A temperature value of the temperature sensor 31 which is present at the input 29 is compared by way of a comparator 45 with a reference value A; the comparator 45 produces a signal when the reference value is exceeded. The signal is connected by an AND element 46 to the output 34 for the start of the fan only when at the same time a signal is present at the input 28, i.e., the engine hood is closed.

Figure 5:
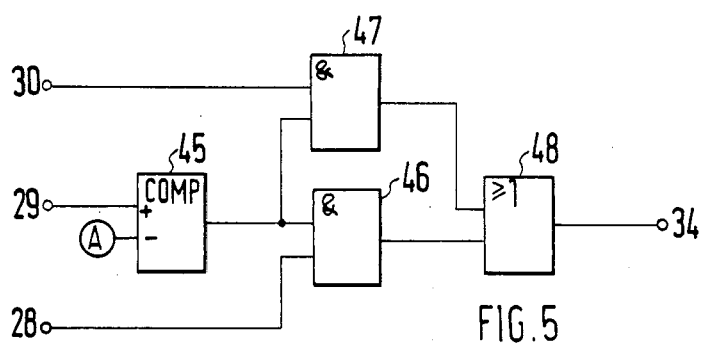

In FIG. 5 this circuit is expanded, corresponding to modification 2, by a further AND element 47 and an OR element 48. The AND element 47 additionally monitors whether the ignition (input 30) of the motor vehicle is turned on and produces a signal only when at the same time a signal is present from the comparator 45. The outputs of the AND elements 46 and 47 are applied to the output 34 combined by way of the OR element 48.

Figure 6:
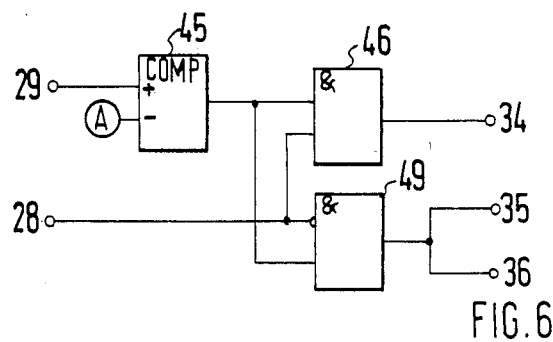

FIG. 6 (modification 3) contains again the function of FIG. 4; the same is expanded by an AND element 49 which is supplied with the signal from the comparator 45 and the negated signal from the input 28 and which with an open engine hood and exceeded reference value in the comparator 45, energizes the signal transmitters in the output 36 and in the output 35 the relay 39 for turning off the ignition.

Figure 7:
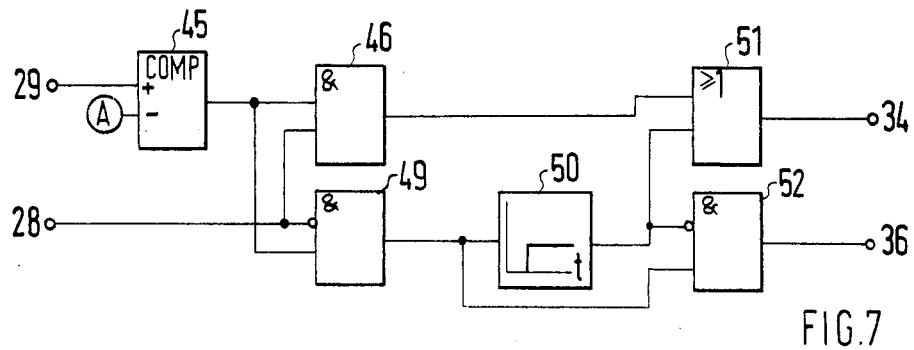

In FIG. 7 this circuit is expanded, corresponding to the modification 4, by a delay element 50 which applies the signal from the AND element 49, delayed by about ten seconds, to the output 34 by way of an OR element 51 so that the fan starts to run delayed by this period of time. During this delay period which is detected by means of a further AND element 52 in which its inputs are fed with the signal ahead of the time-delay member 50 and with the negated signal at the output thereof, the signal transmitters 37 and 38 are energized in the output 36.

Figure 8:
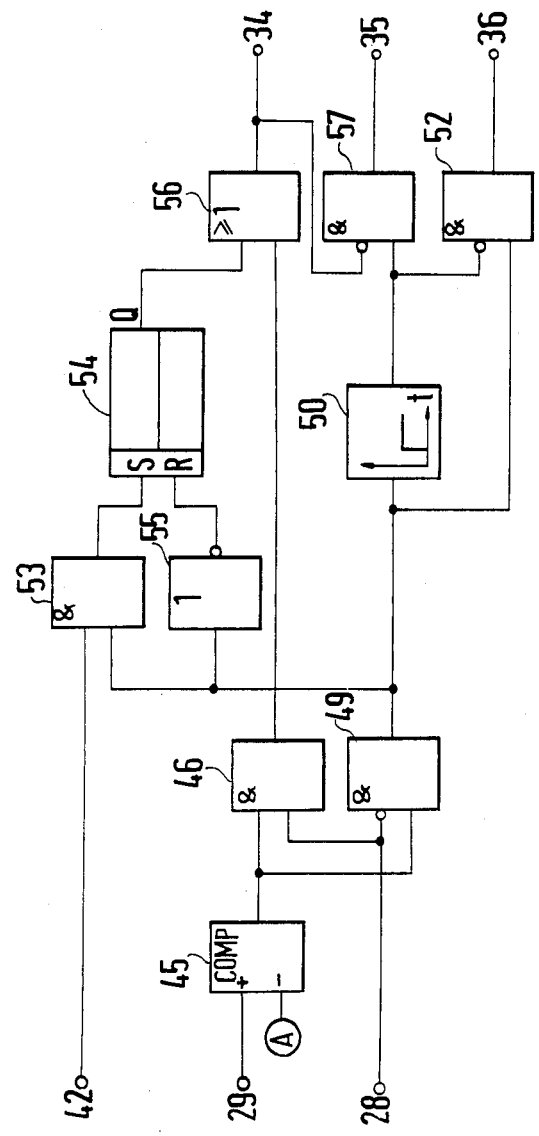

The control of the signal transmitters 37 and 38 takes place in FIG. 8 (modification 5) in a similar manner as in FIG. 7. However, in that case the fan has to be manually started by way of the push button switch 43. For that purpose, an AND element 53 receives a signal of the push button switch 43 by way of the input 42. The second input of the AND element 53 is connected with the output of the AND element 49. Its output is connected with a setting input S of an R-S-flip-flop 54; the resetting input R thereof is supplied with the output signal of the AND element 49 inverted by an inverter 55. The components 53 to 55 represent a self-holding circuit which is set by means of the push button when the comparator 45 has responded, and is reset again when dropping below the reference value A in the comparator 45. The output 34 (fan) is controlled by way of an OR element 56 by means of an output Q of the R-S-flip-flop 54 (or the output of the AND element 46).

If no actuation of the push button switch 43 takes place during the control period (=delay period) of the signal transmitters and therewith no starting of the fan, then the relay 39 for interrupting the ignition is energized by way of an AND element 57. The AND element 57 receives for that purpose a negated signal from the OR element 56 and a signal from the time-delay member 50.

Of course, the control apparatus may also be constructed by means of a microprocessor which then assumes the functions of the logic components, of the comparator and of the delay member. Similarly, in lieu of the electric motor 16, also an electromagnetic clutch of a fan driven by the internal combustion engine may be controlled by one of the circuits according to FIGS. 2 to 8.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A cooling installation for internal combustion engines with at least one auxiliary fan adapted to be selectively engaged, said fan being arranged inside of a space adapted to be closed by a cover means, comprising control means for controlling the fan in such a manner that with an opened cover means an unexpected restarting of the fan is prevented.

2. A cooling installation according to claim 1, wherein the control means is operable to render the fan inoperable with an opened cover means.

3. A cooling installation according to claim 1, wherein the control means is operable to put the fan into a condition, when the cover means is opened, which prevents said unexpected restarting of said fan after a preceding turning off.

4. A cooling installation according to claim 1, wherein the control means is operable to announce beforehand by at least one of acoustic and optical signals the restarting of the fan or an increased cooling requirement of the internal combustion engine.

5. A cooling installation according to claim 1, wherein the space is an internal combustion engine space of a body of a vehicle and wherein the cover means is an engine hood adapted to close said internal combustion engine space.

6. A cooling installation according to claim 1, wherein said control means is operable exclusively with opened cover means and turned-off internal combustion engine to turn off the fan or prevent its restarting.

7. A cooling installation according to claim 4, wherein said control means includes manually actuated means which must be actuated for turning on the fan after an increased cooling air requirement of the engine is indicated by the optic or acoustic signal.

8. A cooling installation according to claim 7, wherein said control means is operable to automatically turn off the internal combustion engine when exceeding a maximum permissive engine temperature.

9. A cooling installation according to claim 1, wherein the closing position of the cover means is monitored by a switch means actuated by the cover means.

10. A cooling installation according to claim 9, wherein the switch means is a mercury switch.

11. A cooling installation according to claim 1, wherein the fan is driven by a drive means and wherein said control means is operable to disconnect said drive means with an open cover means.

12. A cooling installation according to claim 11, wherein with an opened cover means, said drive means is disconnected from its voltage supply directly by a switch means.

13. A cooling installation according to claim 11, wherein said drive means is disconnected from its voltage supply by way of a relay means.

14. A cooling installation according to claim 11, wherein said drive means includes an electric motor.

15. A cooling installation according to claim 11, wherein said drive means includes an electromagnetic clutch operatively connecting the internal combustion engine with the fan.

16. A cooling installation according to claim 11, wherein the closing position of the cover means is monitored by a switch means actuated by the cover means.

17. A cooling installation according to claim 16, wherein the switch means influences a control apparatus of the fan.

18. A cooling installation according to claim 1, wherein the fan is equipped with additional passive protective means.

* * * * *